United States Patent Office

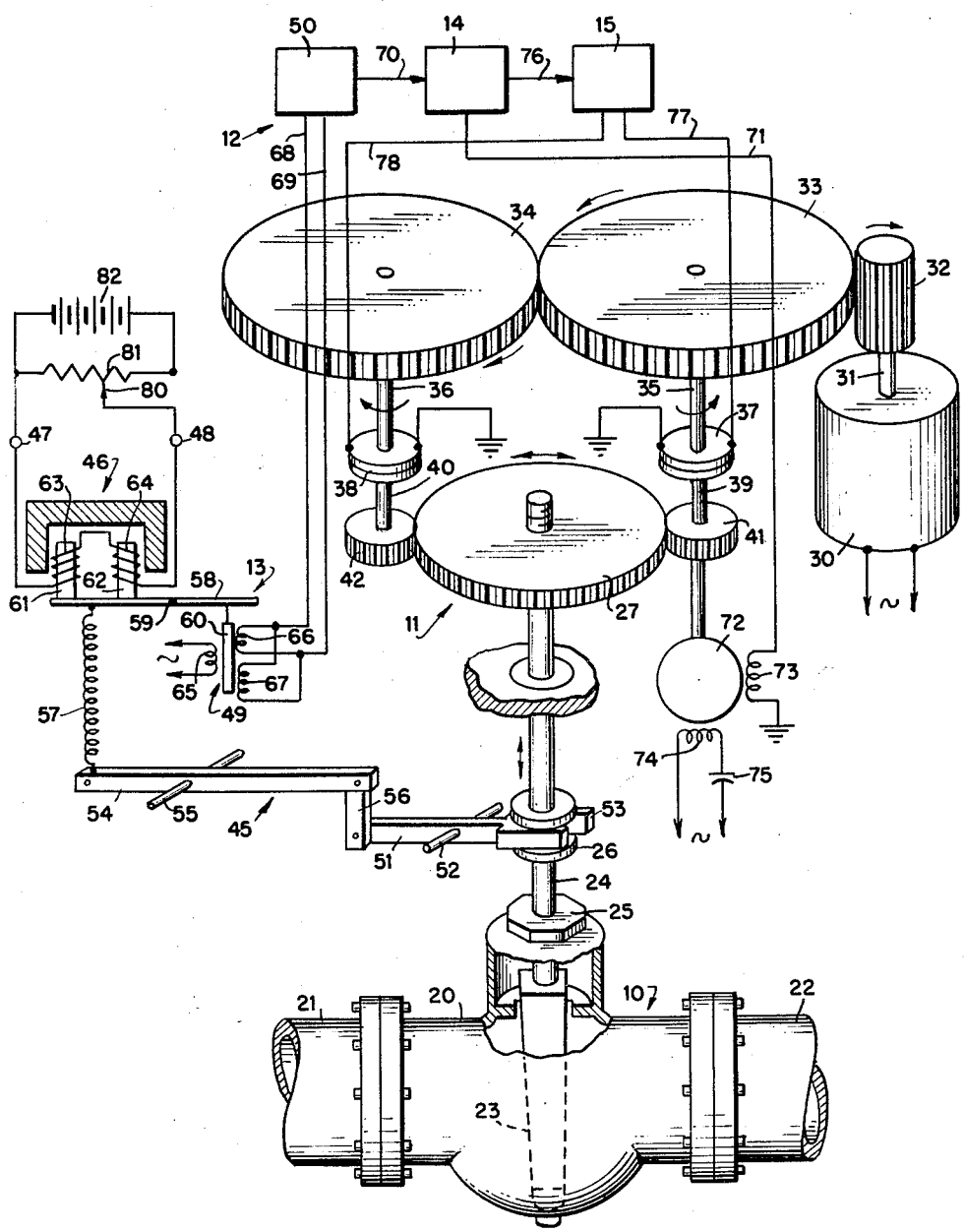

2,911,843
Patented Nov. 10, 1959

2,911,843

DRIVE APPARATUS

George R. Mitchell, Homewood, Ill., assignor to Sinclair Refining Company, New York, N.Y., a corporation of Maine Application January 26, 1959, Serial No. 789,023

5 Claims. (Cl. 74—361)

This application is a continuation-in-part of my copending application, Serial No. 630,257, filed December 24, 1956.

My invention relates to valve actuation and in particular provides an electromechanically actuated valve.

With the advent of control systems employing electric current rather than compressed air and hydraulic fluid as a control medium there has been an interest in replacing diaphragm valve actuators and the like requiring compressed air or hydraulic fluids for operation with devices which rely solely on electromechanical actuation.

It is therefore a principal object of my invention to provide an electromechanically actuated valve suitable for remote operation by an input electrical control signal which can be manually selected or which can be determined by a control instrument developing an electric output.

It is a further object of my invention to provide a valve having a bi-directional rotating drive developing a high torque to energy ratio comparable to linear thrust developed by conventional pneumatic and hydraulic controls.

It is still a further object of my invention to provide such a valve suitable for operation by an electric control system and capable of high positioning accuracy, minimizing overshooting, simple error and phase detection, and essentially flat frequency response.

These and other objects of my invention, which will become apparent hereinafter, are basically achieved with a rotatively actuated valve which is connected to a continuously operating electrical motor by a pair of transmissions each of which includes an electromagnetic clutch and which are connected to the valve opposing each other such that actuation of one clutch will tend to displace the valve stem in one direction to close the valve and actuation of the other clutch will tend to displace the valve stem in the opposite direction to open the valve. A closed loop, automatic feedback system is employed to control the position of the screw driven valve stem through such bi-directional drive responsive to the deviation between the position of the stem and an input electrical control signal. In a more particular aspect the control system also includes means for damping the movement of the valve stem as it approaches a desired position. Such damping can be rate damping responsive to the rate of rotation of the valve stem actuator to control the speed of the correcting movement of the valve stem as the valve approaches the desired position. Alternatively, damping can be furnished by an anticipating device operative when the valve stem actuator rotates to decontrol the position feedback system just prior to the valve's reaching the desired position.

For a more complete understanding of the practical application for the principles of my invention reference is made to the appended drawing which is a diagrammatic illustration of an electromechanically actuated valve having a bi-directional drive and employing an electrical control system utilizing both position feedback and damping in accordance with the principles of my invention.

In the drawing the reference numeral 10 indicates a slide valve, the position of which is operated by bi-directional drive 11 controlled by an electrical control system 12, including an error detector 13, an amplifier 14 and an error corrector control 15, for developing a correcting signal governing the operation of bi-directional drive 11.

Valve mechanism 10 includes a housing 20 connected at one end to a conduit 21 and connected at the other end to a conduit 22. Within housing 20 is located a valve element 23 which is reciprocable transversely of the ends of housing 20 to control the passage of fluids between conduits 21 and 22. A valve stem 24 which extends slidably through a fluid-tight bushing 25 into housing 20 is affixed to valve element 23, and hence, longitudinal movement of stem 24 causes element 23 to slide across the interior of housing 20 in one direction or the other to open or close valve 10.

Valve stem 24 externally carries a flanged collar 26 and is received in threaded engagement by a gear 27 which is operated by bi-directional drive 11.

Bi-directional drive 11 includes a continuously operable A.C. motor 30, the output shaft 31 of which carries a pinion 32 which meshes with a gear 33. Gear 33 also meshes with a gear 34 in 1:1 ratio such that the output shafts 35 and 36, respectively driven by gears 33 and 34, are counterrotating at the same speed. Shafts 35 and 36 are respectively connected to the input sides of electromagnetically actuated friction clutches 37 and 38, the output sections of which respectively drive shafts 39 and 40 which respectively carry pinions 41 and 42 each of which meshes with gear 27 carried on valve stem 24. Thus, when motor 30 is continuously operating, actuation of clutch 37 causes gear 27 to rotate in a direction tending to open valve element 23 and similarly actuation of clutch 38 causes valve stem 24 to move in a direction tending to close valve element 23.

Error detector 13 includes a position feedback device 45, a referencing device 46 having input terminals 47 and 48 for connection to a manually or instrumentally operated control signal, a differential transformer 49 and a preamplifier 50.

More specifically position feedback device 45 includes a lever 51 pivotally mounted at its center on a fixed pin 52 and having a forked end 53 received by collar 26 between the end flanges of collar 26 such that vertical movement of valve stem 24 produced by rotation of gear 27, will cause lever 51 to pivot about pin 52. A second lever 54 pivotally mounted on its center on a fixed pin 55 is pivotally connected at one end to one end of a link 56 which is also pivotally connected at its other end to the end of lever 51 remote from fork 53. At its other end lever 54 is connected through a tensed coil spring 57 to a balance arm 58 which is also pivotally supported near its center as indicated by the reference numeral 59.

At its end opposite spring 57 balance arm 58 carries a ferro-magnetic core 60 arranged such that movement of arm 58 about pivot point 59 will cause core 60 to move into and out of differential transformer 49. Arm 58 also carries at the same end as coil spring 57 a pair of ferro-magnetic cores 61 and 62 which are slidably received as cores in a pair of coils 63 and 64 connected in series across input terminals 47 and 48. Thus the position of core 60 in transformer 49 is a function of the input signal connected across terminals 47 and 48 and of the position of valve element 23.

The primary winding 65 of transformer 49 is supplied with alternating current; and accordingly, since the output windings 66 and 67 are connected 180° out of phase by lines 68 and 69 to preamplifier 50, the output of preamplifier 50 is an electrical signal which is a function of the same difference in inputs and thus is an error signal which can be utilized to cause valve 23 to assume a specific position for any given input signal at terminals 47 and 48 which will produce a zero error signal output from preamplifier 50.

Amplifier 14 which suitably includes thermionic vacuum tube triode circuits in one arrangement is supplied both with an input error signal (the output of preamplifier 50) as indicated by line 70 and a rate feedback input via line 71 derived from an A.C. tachometer generator 72 the armature of which is connected to drive shaft 39 such that the output voltage tapped from secondary winding 73 by line 71 is a function of the speed of rotation of gear 27 and accordingly of the speed of movement of valve element 23. The primary winding 74 of generator 72 is suitably supplied with alternating current in series with a capacitor 75.

Amplifier 14 suitably is constructed such that the rate feedback signal supplied via line 71 biases one or more of the vacuum tubes in the amplifier thus controlling amplification of the error signal introduced via line 70 as a function of the speed of valve element 23 by driving the amplifier tubes past cut-off bias when the speed of gear 27 exceeds some preselected rate. The net correcting signal output of amplifier 14 is fed via line 76 to error corrector control system 15 which functions as a phase detector supplying current via line 77 to energize clutch 37 when the error signal developed by detector 13 indicates the difference between the control signal supplied across input terminals 47 and 48 and the position of valve element 23 demands that valve element 23 be further opened. Conversely error corrector 15 energizes electric magnetic clutch 38 via line 78 when the difference between the signal applied to input terminals 47 and 48 and the position of valve element 23 demands that valve element be further closed.

Thus in operation terminals 47 and 48 are suitably connected to a reference potential source such as the movable tap 80 of a potentiometer 81 connected across a D.C. power supply 82. Since the position of core 60 represents a balance between the force exerted by spring 57 and the magnetic force produced by passage of current through coils 63 and 64, it will be apparent that for every setting of tap 80 there will be a corresponding position of valve element 23 in which the control system is balanced and the error signal is zero. Starting in such a balanced state, if tap 80 is moved to decrease the potential applied to terminals 47 and 48, arm 58 will revolve a short distance counter clockwise producing an error signal in the output of transformer 49, which preamplified at 50, amplified at 14 and detected at 15 will energize clutch 37. It should be observed that motor 30 is constantly rotating and thus gears 33 and 34 are also rotating counter to each other. The energization of clutch 37 couples shafts 35 and 39 causing gear 27 to rotate in a direction raising valve stem 24 to open valve element 23 and at the same time decreasing through linkage 45, the tension on spring 57 tending to restore core 60 to a balanced, zero error signal position. As gear 27 begins to turn at an increasingly faster rate the output of tachometer generator 72 increases the bias on amplifier 14 past cut-off until no error signal appears in line 76 whereupon clutch 37 is de-energized. Decoupled gear 27 then decelerates until the output of generator 72 is decreased sufficiently for the error signal to overcome the cut-off bias of amplifier 14. The error signal in line 76 is then restored and clutch 37 is again energized. It will be evident that large error signals will overcome greater biases on amplifier 14 than small error signals, and hence "pecking action" of error corrector 15 can be controlled such that overshooting is held to a minimum and effective damping of the movement of valve element 23 is achieved.

In another suitable arrangement in accordance with my invention instead of supplying rate feedback to amplifier 14 to control the speed of movement of valve stem 24, a small portion of feedback signals from tachometer generator 72 is connected as an input at a stage of amplifier 14 where the error signal is of considerably larger magnitude than the portion of the feedback signal derived from tachometer generator 72 such that the latter bucks the error feedback. Thus, damping control of the correcting movement is no longer based on driving the amplifier tubes past cut-off bias. Accordingly, gear 27 will assume a constant speed since the clutch 37 or 38 through which gear 27 is connected to motor 30 remains energized until the error signal fed to amplifier 14 reaches a very small value at which the bucking feedback signal from generator 72 cancels the error signal. At such point the clutch 37 or 38 which was energized will be de-energized, and gear 27 and valve stem 24 will stop moving, stopping the movement of valve element 23. The amount of the tachometer generator 72 output fed to amplifier 14 is adjusted such that the coasting of gear 27 and valve stem 24 to stopped position from their normally constant rate of movement will carry the valve element 23 the precise distance required to reach the desired position. Since ordinarily the same constant rate of rotation of gear 27 will occur in any correctional movement required by the control system, one adjustment of the amount of tachometer generator 72 feedback to a correct value at which valve stem 24 coasts to a stop exactly at the desired position will ordinarily be all that is required.

I claim:

1. In a valve including a longitudinally movable operator therefor and actuating means for said operator rotatably cooperating therewith, the improvement which comprises a first power transmission means including a first electromagnetically actuated clutch, a second power transmission means including a second electromagnetically actuated clutch, said first and second transmission means being separately connected to said actuating means to rotate said actuating means, drive means connected to each of said first and second power transmission means whereby said actuating means is rotated in one direction by said first transmission means when said first clutch is actuated and in the opposite direction by said second transmission means when said second clutch is actuated, and control means for selectively actuating said first and second electromagnetic clutches, said control means including a position sensitive device connected to said operator and having an output responsive to the longitudinal position of said operator, and a second sensitive device connected to said actuating means having an output responsive to the rotation thereof.

2. In a valve including a longitudinally movable operator therefor and actuating means for said operator rotatably cooperating therewith, the improvement which comprises a first power transmission means including a first electromagnetically actuated clutch, a second power transmission means including a second electromagnetically actuated clutch, said first and second transmission means being separately connected to said actuating means to rotate said actuating means, drive means connected to each of said first and second power transmission means whereby said actuating means is rotated in one direction by said first transmission means when said first clutch is actuated and in the opposite direction by said second transmission means when said second clutch is actuated, and control means for selectively actuating said first and second electromagnetic clutches, said control means including a position sensitive device connected to said operator and having an output responsive to the longitudinal position of said operator, and a rate sensitive device connected to said actuating means and having an output responsive to the rate of rotation thereof.

3. The improvement according to claim 2 wherein said control means selectively actuates said first and second electromagnetically actuated clutches in response to a difference between the output of said position sensitive device and an input reference signal at a rate responsive to the output of said rate sensitive device to drive said operator to a position in which the output of said position sensitive device equals the input reference signal.

4. The improvement according to claim 2 wherein said position sensitive device further comprises an electromagnetic referencing device including a balance arm, spring means mechanically connected to said operator and said balance arm to exert a force on said arm responsive to longitudinal position of said operator, means for electromagnetically coupling an input reference signal to said arm to exert a force on said arm responsive to said input reference signal, and a differential transformer responsive to the position of said arm for generating an output signal.

5. In a valve including a longitudinally movable operator therefor and actuating means for said operator rotatably cooperating therewith, the improvement which comprises a first power transmission means including a first electromagnetically actuated clutch, a second power transmission means including a second electromagnetically actuated clutch, said first and second transmission means being separately connected to said actuating means to rotate said actuating means, drive means connected to each of said first and second power transmission means whereby said actuating means is rotated in one direction by said first transmission means when said first clutch is actuated and in the opposite direction by said second transmission means when said second clutch is actuated, and control means for selectively actuating said first and second electromagnetic clutches, said control means including a position sensitive device connected to said operator and having an output responsive to the longitudinal position of said operator, and a second sensitive device connected to said actuating means and having an output responsive to the rotation thereof, said control means selectively actuating said first and second electromagnetically actuated clutches in response to a difference between the output of said position sensitive device and an input reference signal to drive said operator toward a position at which the output of said position sensitive device equals the input reference signal, and said control means selectively deactuating said first and second clutches in response to said output of said second sensitive device at a position of said operator approaching said position thereof at which the output of said position sensitive device equals the input reference signal.

No references cited.